Nov. 14, 1933.   F. C. FRANK   1,934,972
WHEEL
Filed Feb. 16, 1928
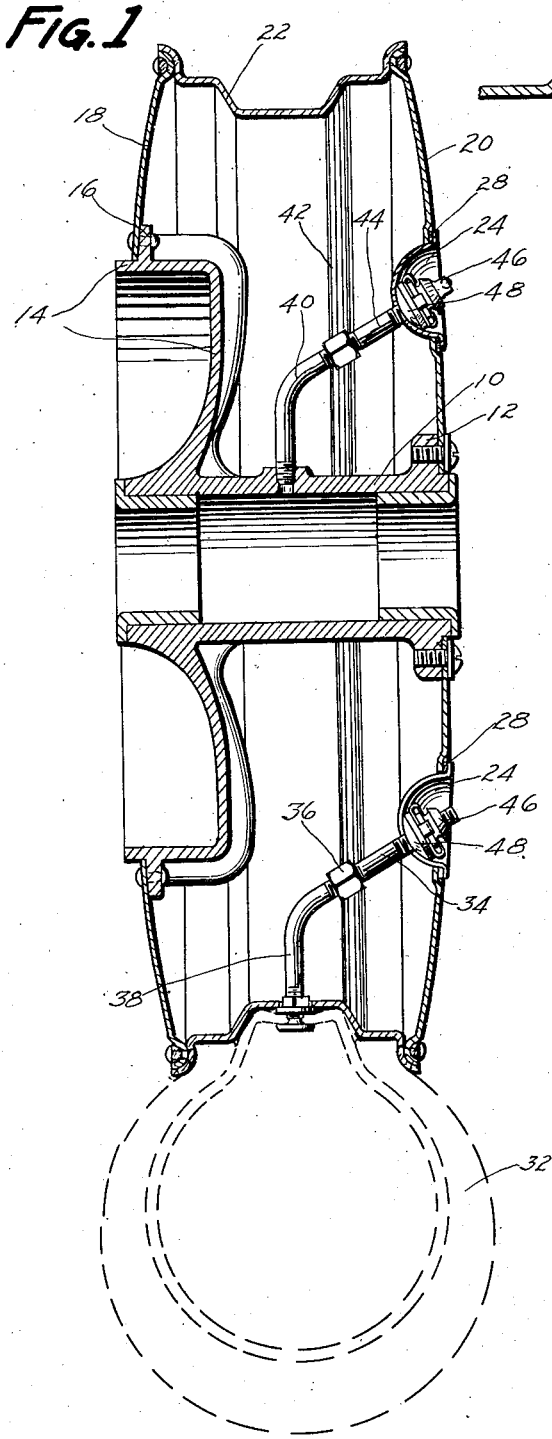
Fig. 1
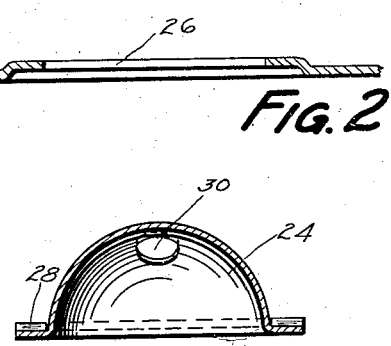
Fig. 2
Fig. 3
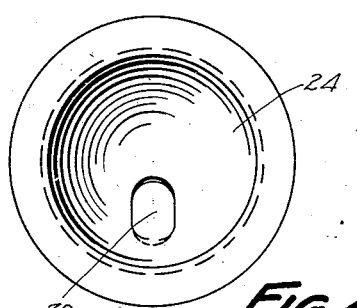
Fig. 4
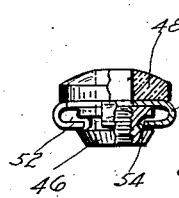
Fig. 5
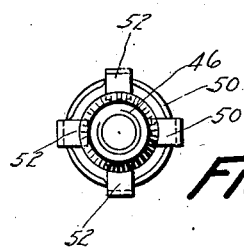
Fig. 6
INVENTOR
FREDERICK C. FRANK
BY
M. W. McConkey
ATTORNEY Patented Nov. 14, 1933

1,934,972

UNITED STATES PATENT OFFICE 1,934,972

WHEEL

Frederick C. Frank, South Bend, Ind., assignor to Bendix Brake Company, South Bend, Ind., a corporation of Illinois Application February 16, 1928. Serial No. 254,644

1 Claim. (Cl. 301—63)

This invention relates to wheels, and is illustrated as embodied in a double-disk wheel for an aeroplane. An object of the invention is to provide for a conduit within the wheel, such as the valve stem or a lubricant conduit, opening through one of the load-carrying disks of the wheel, without in any way interfering with the stream-lining of the wheel.

Having this object in view, one of the load-carrying disks is provided with a hemispherical part or stamping in its side, forming a depression extending toward the center plane of the wheel, and through which the conduit extends. Preferably a nut threaded on the conduit has a spherical base portion seated against the hemispherical part, so that the tightening of the nut will draw the hemispherical part under tension against the load-carrying member.

The above and other objects and features of the invention, including various novel and desirable details of construction, will be apparent from the following description of the illustrative embodiment shown in the accompanying drawing, in which:

Figure 1 is a section diametrically through the wheel;

Figure 2 is a section through the stamping described above, before it is drawn into its final hemispherical form;

Figure 3 is a similar section after drawing to hemispherical form;

Figure 4 is a bottom plan view of the part shown in Figure 3;

Figure 5 is a view, partly in side elevation and partly in section, of the nut, and Figure 6 is a bottom plan view of the nut shown in Figure 5.

The illustrated wheel, preferably constructed of duraluminum, includes a hub 10, formed with a short flange 12 at one end and with an integral brake drum 14 at the other end. The brake drum 14 is also formed with a short flange 16. Two load-carrying members or disks 18 and 20, secured respectively to flanges 16 and 12, are secured to opposite sides of a tire-carrying rim 22.

Two openings are formed in disk 20, for hemispherical parts or stampings 24, drawn from flat blanks 26 such as shown in Figure 2, and seated against gaskets 28 to form water-tight joints when drawn tight. Gaskets 28 may be vulcanized to parts 24 so they will not be lost. Parts 24 are formed with openings 30 for two conduits, one of which forms a valve stem for a tire 32 or rim 22, and the other of which is a lubricant conduit for hub 10.

The valve stem includes a threaded part 34 extending through one opening 30 and having a union 36 threaded on the end of the angular valve stem 38 of the tire 32. The lubricant conduit 40 for hub 10 has a similar threaded union 42 connecting it to a threaded part 44 extending through the other opening 30.

On each of the parts 34 and 44 there is threaded a nut 46 having a tapered base portion 48, of rubber or the like vulcanized to a washer 50, having tongues 52 bent into a groove 54 in nut 46, to secure the base and the nut permanently together as a subassembly. By tightening nuts 46, parts 24 can be drawn under tension against gaskets 28.

While one illustrative embodiment has been described in detail, it is not my intention to limit the scope of the invention to that particular embodiment, or otherwise than by the terms of the appended claim.

I claim:

A wheel including a rim and a pair of load carrying disk members secured to opposite sides of the rim, one of said members having an opening therein adjacent the rim in combination with a substantially hemispherical stamping seated within said opening and extending toward the center plane of the wheel, said stamping having a surrounding flange overlying and engaging the wall of said member adjacent said opening, a tire inflating conduit extending through said rim inside of the wheel between the members and having its outer end extending through an opening in said stamping, and means threaded on said conduit engaging said stamping, said means serving to hold said stamping in tension against the load carrying member through said flange thereon.

FREDERICK C. FRANK.